J. R. FISCHER & J. DITZLER.
FASTENER FOR VESSELS.
APPLICATION FILED AUG. 4, 1909.
945,450.
Patented Jan. 4, 1910.
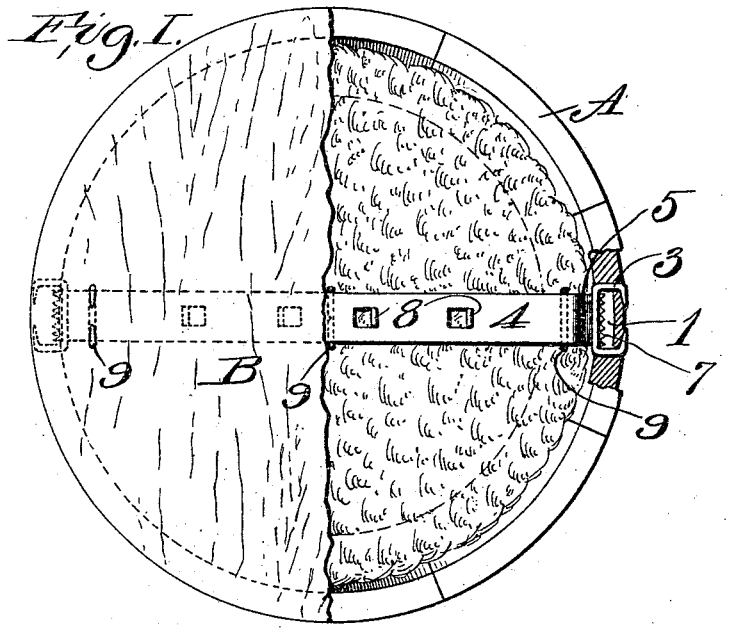
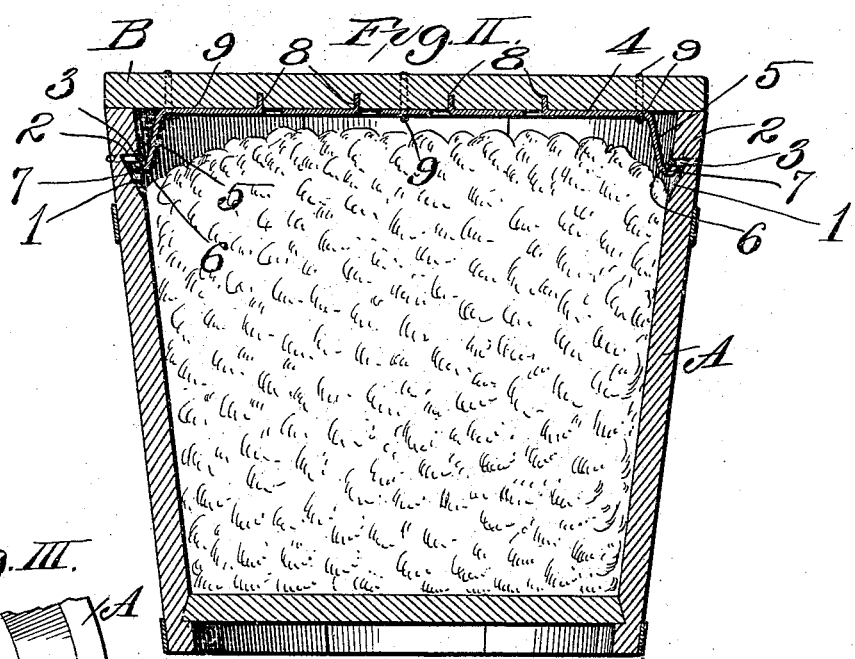
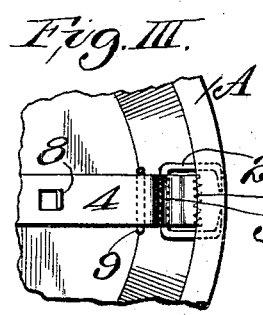
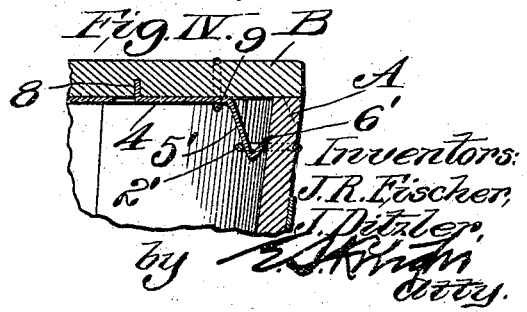
Inventors:
J. R. Fischer,
J. Ditzler,

UNITED STATES PATENT OFFICE.

JOHN R. FISCHER AND JOHN DITZLER, OF ST. LOUIS, MISSOURI.

FASTENER FOR VESSELS.

945,450.   Specification of Letters Patent.   Patented Jan. 4, 1910.

Application filed August 4, 1909. Serial No. 511,205.

*To all whom it may concern:*

Be it known that we, JOHN R. FISCHER and JOHN DITZLER, citizens of the United States of America, residing in the city of St. Louis and State of Missouri, have invented certain new and useful Improvements in Fasteners for Vessels, of which the following is a full, clear, and exact description, reference being had to the accompanying drawings, forming a part of this specification.

Our invention relates to a fastener for use upon vessels of various descriptions in which commodities are shipped, and it has for its object the production of a fastening that is in part attached to the cover of the vessel at its under side and is adapted to engage the walls of the vessel interiorly thereof when the lid is applied to the vessel body, whereby the lid is secured in such manner as to render it impossible to remove it without destroying it, thereby preventing the removal of the lid and the extraction of contents from the vessel during shipment of goods contained therein.

Figure I is in part a top or plan view and in part a horizontal section of a vessel having a fastening applied thereto, a portion of the vessel lid being broken away to afford a view of the parts beneath it. Fig. II is a vertical section through the vessel shown in Fig. I and our fastening. Fig. III is a top view of a fragment of a vessel and illustrates a modification of our fastening, the vessel lid being omitted. Fig. IV is a vertical section of a fragment of a vessel and its lid with the modification shown in Fig. III in place in the vessel.

In the accompanying drawings:—A designates the body of a vessel and B its lid. The vessel shown is a pail, but it will be obvious that it might be a box or other form of container.

In the wall of the vessel are notches 1 located diametrically opposite each other, these notches being preferably sloped upwardly and outwardly, and having at their upper ends horizontal shoulders 2.

3 are staples seated in the wall of the vessel and spanning the upper ends of the notches 1, the staples being preferably driven through the vessel wall and being clenched at the exterior of the vessel, as seen most clearly in Fig. I.

4 designates a strap seated against the lower face of the vessel lid B and having downturned arms 5 that terminate at their free ends in outturned and upturned hooks 6 provided with teeth 7. The strap 4 is provided with prongs 8, preferably struck from the body of the strap, and which are embedded in the lid B for the purpose of holding said strap from longitudinal movement relative to the lid and the strap is secured to the lid to prevent separation of these members by suitable means, such as staples 9. The staples just mentioned are preferably driven through the lid in positions to straddle the strap at the under side of the lid and clenched at the top of the lid.

When a vessel equipped with our fastening device is to be closed and the lid secured thereto, it is only necessary to press the lid downwardly to seat it on the body of the vessel, when the arms 5 of the strap 4 which are of yielding nature due to the strap being of a springing material, will be pressed inwardly away from the vessel wall as they move downwardly in contact with the wall and the staples 2. Immediately after the hooks 6 of the arms 5 pass beneath said staples, the arms move outwardly and said hooks are carried upwardly in the notches of the wall of the vessel so that the teeth of the hooks 6 are in position to engage the horizontally arranged shoulders at the upper ends of the notches and prevent separation of the lid from the body of the vessel.

It will be obvious that the fastening device herein described cannot be tampered with, for the reason that it is entirely concealed within the vessel on which it is used and as a consequence, the contents of the vessel will remain undisturbed during shipment.

An advantage of our improvement not previously mentioned is that the fastening means prevents the re-use by unscrupulous persons of the vessels in which original shipments are made in efforts to trade upon the reputations of original users of the vessels.

In Figs. III and IV we have shown a modification in which the cutting of notches in the walls of the vessels on which the fastening means is employed is dispensed with. In this modification, the staples 2' are so mounted in the walls of vessels equipped with the fastening devices as to provide loops interior of the vessels into which the spring arms 5' of the fastener strap 4 may seat. The spring arms 5' are provided with toothed spurs 6' extending upwardly from the lower ends of the arms and which, with the arms, seat within the loops of the staples 2', as seen most clearly in Fig. IV. When a vessel lid with this modified form of our fastening device is pressed downwardly onto the body of the vessel, the spur 6' rides downwardly against the wall of the vessel, which causes it to be forced backwardly toward the arm 5' so that it, with the lower end of the arm 5', is tightly bound within the loop of the staple 2'. Then, if any attempt is made to remove the lid from the vessel, the spur 6' bites into the wall of the vessel and effectually prevents the separation of the lid from the vessel body.

We claim:—

1. The combination with a vessel body and a lid therefor, of a fastener strap secured to said lid and located wholly at its bottom and having spring arms depending from the lid for engagement with the wall of said vessel body.

2. The combination with a vessel body and a lid therefor, of a fastener strap secured to said lid and located wholly at its bottom and having downwardly extending spring arms provided with upturned spurs for engagement with the wall of said vessel body.

3. The combination with a vessel body and a lid therefor, of a fastener strap secured to said lid and located wholly at its bottom and having downwardly extending spring arms provided with upturned spurs, the wall of the vessel body being notched to receive said spurs.

4. The combination with a vessel body and a lid therefor, of a fastener strap secured to said lid and having downwardly extending spring arms provided with upturned spurs, the wall of the vessel body being notched to receive said spurs, and staples mounted in the wall of the vessel body at the location of said notches.

JOHN R. FISCHER.
JOHN DITZLER.

In the presence of—
Wm. H. Scott,
E. B. Linn.